United States Patent [19]
Gauthier-Lafaye et al.

[11] Patent Number: 4,576,809
[45] Date of Patent: Mar. 18, 1986

[54] PREPARATION OF ALKALI OR ALKALINE EARTH METAL COBALTTETRACARBONYLATES AND CATALYSTS OF CARBONYLATION REACTIONS THEREWITH

[75] Inventors: Jean Gauthier-Lafaye, Lyons; Robert Perron, Charly, both of France

[73] Assignee: Rhone-Poulenc Specialities Chimiques, Courbevoie, France

[21] Appl. No.: 549,553

[22] Filed: Nov. 7, 1983

[30] Foreign Application Priority Data

Nov. 5, 1982 [FR] France ............................... 82 18729
Sep. 13, 1983 [FR] France ............................... 83 14732

[51] Int. Cl.$^4$ .................... C10G 1/04; B01J 21/18; B01J 27/20; C07C 51/10
[52] U.S. Cl. ................................. 423/418; 423/417; 502/174; 562/406
[58] Field of Search ................ 423/417, 418; 502/174

[56] References Cited

U.S. PATENT DOCUMENTS 2,865,716 12/1958 Hasek .................................. 423/418
3,684,491 8/1972 Coffield et al. ..................... 423/418

FOREIGN PATENT DOCUMENTS 1381022 10/1964 France ............................... 423/417
47-49998 12/1972 Japan ................................. 423/418
55-27015 2/1980 Japan ................................. 502/174
55-56020 4/1980 Japan ................................. 423/417

*Primary Examiner*—P. E. Konopka
*Attorney, Agent, or Firm*—Burns, Doane, Swecker & Mathis

[57] ABSTRACT

Alkali or alkaline earth metal cobalttetracarbonylates well suited for catalyzing carbonylation reactions, e.g., the carbonylation of organic compounds comprising halomethyl functions, are facilely prepared by reacting a cobalt (II) compound with carbon monoxide in the presence of (i) an inorganic base which comprises an alkali or alkaline earth metal hydroxide or an alkali or alkaline earth metal bicarbonate and (ii) at least one sulfur compound having at least one sulfur atom, the oxidation state of which being no greater than +3, and in a reaction medium comprising water, an alcohol, an ether, or admixture of water and an alcohol or an ether.

13 Claims, No Drawings

PREPARATION OF ALKALI OR ALKALINE EARTH METAL COBALTTETRACARBONYLATES AND CATALYSTS OF CARBONYLATION REACTIONS THEREWITH

BACKGROUND OF THE INVENTION

1. Field of the Invention

The present invention relates to a process for obtaining alkali metal or alkaline earth metal salts of tetracarbonylcobalt hydride and solutions thereof.

2. Description of the Prior Art

The alkali metal or alkaline earth metal cobalttetracarbonylates which correspond to the formula $M[Co(CO)_4]_n$ in which M denotes an alkali metal or alkaline earth metal and n is 1 or 2 are known compounds employed as catalysts for numerous reactions involving carbon monoxide. Thus, for example, the alkali metal or alkaline earth metal cobalttetracarbonylates are employed as catalysts for carbonylation of alkyl halides, cycloalkyl halides or aryl halides for the preparation of organic acids or derivatives thereof, particularly esters. Hence, French Pat. No. 1,313,360 described a process for preparing derivatives of carboxylic acids, and particularly esters, by carbonylation of an organic halide with carbon monoxide in the presence of salts such as tetracarbonylcobalt hydride and in particular of alkali metal or alkaline earth metal salts of such hydride and of compounds having labile hydrogen atoms (water, alcohols, mercaptans, and primary or secondary amines) in a basic environment. This process is most particularly suitable for the preparation of phenylacetic acids and derivatives thereof. In French patent application No. 70/26,593, published under No. 2,055,331, it has been proposed to prepare phenylacetic acid by carbonylation of benzyl chloride with carbon monoxide in the presence of calcium cobalttetracarbonylate prepared by reacting a cobalt salt with carbon monoxide in the presence of lime, an iron/manganese alloy and sulfur-containing promoters, in a medium of water and methanol. An analogous process has been described for the preparation of α-thienylacetic acid (cf. French patent application No. 78/07,980 published, under No. 2,420,534). Finally, in French patent application No. 75/00,533, published under No. 2,297,200, and the Addition thereto, No. 75/29,459, a process was proposed for double carbonylation of arylmethyl halides to arylpyruvic acid with carbon monoxide in the presence of an alkaline earth base and of an alkali metal salt or alkaline earth metal salt of tetracarbonylcobalt hydride, under a carbon monoxide pressure of between 5 and 200 bars. Alternative versions of this process have been described in U.S. Pat. No. 4,351,952 and in French patent application No. 79/16,170 published under No. 2,429,772.

Other than their use as catalysts for carbonylation, the alkali metal or alkaline earth metal cobalttetracarbonylates can also be employed for the preparation of dicobaltoctacarbonyl by decomposition of tetracarbonylcobalt hydride liberated by acidifying solutions of alkali metal or alkaline earth metal cobalttetracarbonylates. They also serve as intermediates for the preparation of other metal salts, such as cobalttetracarbonylates of silver, zinc, mercury and cadmium which are employed as catalysts for carbonylation of alcohols to esters (cf. British Pat. No. 715,515). Finally, alkali metal or alkaline earth metal cobalttetracarbonylates are of considerable interest in industrial organic synthesis and for this reason it would be desirable to develop a process for preparing these compounds which could be easily employed on an industrial scale. Whatever the destination of the alkali metal or alkaline earth metal cobalttetracarbonylates (preparation of dicobaltoctacarbonyl or direct use as a catalyst in the above-mentioned carbonylation reactions), serious need exists in the industry for a process for preparing alkali metal or alkaline earth metal cobalttetracarbonylates starting from common inorganic salts of cobalt (II) and carbon monoxide, at ambient pressure or under a moderate pressure of carbon monoxide and providing, if necessary, solutions of alkali metal or alkaline earth metal cobalttetracarbonylates which can be employed directly in industry for use in carbonylation processes. Numerous methods have been suggested without providing a satisfactory solution to this problem. Thus, as early as 1936, G. W. Coleman et al, *J. Am. Chem. Soc.*, 58, beginning at page 2160, described a process for preparing potassium cobalttetracarbonylate by the reaction of cobalt nitrate with carbon monoxide at normal pressure in the presence of various additives promoting the absorption of carbon monoxide, such as potassium cyanide, cysteine or tartaric acid. The use of potassium cyanide has been pursued by numerous authors, for example: A. A. Blanchard et al, *J. Am. Chem. Soc.*, 62, 1192–1193 (1940); F. Seel, *Z. Anorg. Chem.*, 269, 40–42 (1952); Y. Takegami et al, *Bull. Chem. Soc. Jap.*, 37, 181–182 (1964); R. J. Clark et al, *J. Organomet. Chem.*, 11, 637–640 (1968). Although this process has the advantage of being capable of operation at atmospheric pressure, it cannot be employed industrially on account of the low reaction rate and/or low yields. In turn, W. Hieber et al, *Z. Anorg. Chem.*, 269, 308–316 (1952), have proposed an improved laboratory process for the synthesis of mercury and silver cobalttetracarbonylates involving an intermediate preparation of the tetracarbonylate ion $Co(CO)_4^-$ by reacting carbon monoxide at normal pressure with cobalt nitrate hexahydrate and sodium dithionite ($Na_2S_2O_4$) in an aqueous solution of ammonia. By reason of the conditions employed, this process is of interest only for the laboratory preparation of silver and mercury cobalttetracarbonylates. In fact, the production of the cobalttetracarbonylate ion $Co(CO)_4^-$ depends on the use of a stoichiometric quantity of sodium dithionite which acts as a reducing agent for the cobalt [cf. W. Hieber et al, *Z. Anorg. Chem.*, 269, 292–307 (1952)]. Moreover, the ammoniacal solutions of ammonium cobalttetracarbonylate which are thus obtained cannot be directly used for certain of the above-mentioned carbonylation reactions, such as the preparation of thienylacetic, phenylacetic or phenylpyruvic acids, which require the use of alkali metal bases or alkaline earth metal bases in an aqueous medium or aqueous alcohol medium. To overcome the specific disadvantages of the process of Hieber et al, loc. cit., it has been proposed in French Patents and Patent Applications No. 70/26,593, No. 78/7,980 and No. 73/29,840 to prepare aqueous, alcoholic or aqueous alcoholic solutions of alkali metal or alkaline earth metal cobalttetracarbonylates by reacting a cobalt salt (chloride, sulfide or bromide) with carbon monoxide, in an alcoholic or aqueous alcoholic medium, in the presence of an alkali metal hydroxide or alkaline earth metal hydroxide, a catalytic amount of a sulfur compound (sodium dithionite, sodium sulfide and sodium thiosulfate) and an iron/manganese alloy. The principal disadvantage of this process is the use of an additional component, the iron/manganese alloy, the use of which in the form of powder complicates the process. Furthermore, the production of good results depends on the use of large quantities of manganese, on the order of 1 gram-atom of metal per mole of cobalt salt, which makes this process unattractive from the point of view of economics.

Finally, none of the processes for preparing cobalttetracarbonylates which are described in the prior art has satisfactorily solved the problem of the industrial preparation of alkali metal or alkaline earth metal cobalttetracarbonylates.

SUMMARY OF THE INVENTION

Accordingly, a major object of the present invention is the provision of an improved process for preparing alkali metal or alkaline earth metal cobalttetracarbonylates which can be readily employed on the industrial scale, and which otherwise avoids those disadvantages and drawbacks to date characterizing the state of this art.

Briefly, it has now surprisingly been found that it is possible to prepare alkali metal or alkaline earth metal cobalttetracarbonylates from cobalt (II) salts under moderate pressures of carbon monoxide in the presence of sulfur derivatives without the need to use iron/manganese alloys.

DETAILED DESCRIPTION OF THE INVENTION

More particularly according to the present invention, provided hereby is a process for preparing alkali metal or alkaline earth metal cobalttetracarbonylates by reaction of a cobalt (II) derivative with carbon monoxide, characterized in that it is carried out in the presence of an inorganic base selected from the alkali metal hydroxides or alkaline earth metal hydroxides and alkali metal bicarbonates or alkaline earth metal bicarbonates and at least one sulfur derivative or compound having at least one sulfur atom whose extent of oxidation is less than or equal to +3, in a medium comprising water, an alcohol, an ether or a mixture of water and an alcohol or an ether.

Consistent herewith, the alkali metal or alkaline earth metal cobalttetracarbonylates are obtained in the form of aqueous solutions or solutions in a mixture of water and an organic solvent which can be employed directly, for example, for the carbonylation of compounds bearing chloromethyl groups.

In view of the above-mentioned prior art, it would be especially unexpected to obtain alkali metal or alkaline earth metal cobalttetracarbonylates by reaction of cobalt (II) derivatives with carbon monoxide in the absence of iron-manganese alloy and without having recourse to the use of a stoichiometric quantity of a sulfur derivative.

Exemplary of sulfur compounds having at least one sulfur atom whose oxidation state is less than or equal to +3, representative are the sulfides, polysulfides, thiosulfates, dithionites, polythionates and mercaptans. Preferably, salts of alkali metals or alkaline earth metals are used.

Among the sulfur compounds employed as catalysts in the process according to the invention, exemplary are sodium sulfide, potassium sulfide, sodium thiosulfate ($Na_2S_2O_3.5H_2O$), potassium thiosulfate, sodium tetrathionate ($Na_2S_4O_6.2H_2O$), sodium hexathionate ($Na_2S_2O_6.2H_2O$), sodium dithionite, potassium dithionite, methyl mercaptan, ethyl mercaptan and thiophenol. It is possible, without departing from the scope of the present invention, to use two or more than two sulfur derivatives. Representatives in this regard, for example, are the combinations sodium sulfide/sodium thiosulfate, and sodium sulfide/sodium dithionite.

The amount of sulfur compound expressed in moles per gram-atom of cobalt can vary over wide limits. Thus, such amount can vary, for example, from 0.01 to 1 mole of sulfur compound per gram-atom of cobalt. Nevertheless, and this is one of the advantages of the process according to the invention, it is not necessary to use more than 0.6 mole of sulfur compound per gram-atom of cobalt. Preferably, this amount ranges from 0.05 to 0.5 mole per gram-atom of cobalt.

As cobalt (II) derivatives which may be employed in the process according to the invention, exemplary are cobalt oxide, cobalt hydroxide, salts of inorganic acids such as cobalt carbonate, nitrate, sulfate, cobalt halides (chloride, iodide, bromide) or salts of aliphatic, cycloaliphatic or aromatic carboxylic acids such as cobalt acetate, cobalt octanoate or cobalt benzoate.

It would of course be possible, again without departing from the scope of the present invention, to employ cobalt salts of other, less common, carboxylic acids, but this would represent no particular advantage. Naturally, the cobalt salts can be employed in their hydrated form. Use is preferably made of compounds having the highest solubility in the reaction medium, such as the cobalt halides, nitrate and acetate.

Among the alkali metal or alkaline earth metal bases which may be employed in the process according to the invention, exemplary are sodium hydroxide, potassium hydroxide, sodium bicarbonate and calcium, barium and magnesium hydroxides. The alkaline earth metal hydroxides are particularly suitable because of their low solubility in the reaction medium; they can, as a result, be readily separated from the reaction solution by simple filtration. When the operation is carried out in an aqueous medium or a mixture of water and organic solvent, the alkali metal sulfides, which are readily hydrolyzable, can perform the dual function of base and sulfur derivative.

Similarly, the alkaline earth metal hydroxides could be formed in situ from the oxides. The quantity of base is preferably at least equal to that which introduces into the reaction medium the number of $OH^-$ ions required by the stoichiometry of the reaction according to the following equation:

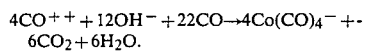

$$4Co^{++} + 12OH^- + 22CO \rightarrow 4Co(CO)_4^- + 6CO_2 + 6H_2O.$$

Consequently, according to the nature of the base, this amount expressed in moles per gram-ion of cobalt is preferably at least equal to approximately 1.5 moles or approximately 3 moles per gram-ion of cobalt. It would of course be possible to use less than the stoichiometric amount of base, but this would be reflected in an incomplete conversion of the cobalt. There is no critical upper limit to the amount of base and it is therefore possible to operate with a large excess of the latter relative to the stoichiometry. In practice, it is preferable not to employ more than 4 moles of base per gram-ion of cobalt.

When the reaction is carried out in an alcohol or in a medium of aqueous alcohol, the alcohol is selected from among the mono- or polyhydroxylated aliphatic, linear or branched, saturated compounds containing from 1 to 10 carbon atoms; cycloaliphatic saturated alcohols containing from 5 to 12 carbon atoms; or arylaliphatic alcohols. As specific examples, representative are methanol, ethanol, propan-1-ol, isopropanol, isobutanol, tertiary butanol, 2,2-dimethylpropan-1-ol, butan-1-ol, butan-2-ol, 3-methylbutan-1-ol, 2-methylbutan-2-ol, 3-methylbutan-2-ol, pentan-1-ol, pentan-2-ol, pentan-3-ol, ethylene glycol, propane-1,2-diol, butane-1,4-diol, cyclopentanol, cyclohexanol, benzyl alcohol or β-phenylethyl alcohol. Preferably, the lower alkanols comprising from 1 to 4 carbon atoms are used. When a water/alcohol mixture is employed, its composition is not critical and can vary over wide limits. Thus, the aqueous alcohol solutions can contain from 5 to 95% by volume of water.

As ethers, there may be employed those derived from the above-mentioned alcohols and polyols or other ethers of aliphatic or cycloaliphatic alcohols, or cyclic ethers. Particularly exemplary are methyl, ethyl, and methyl ethyl ethers, propyl, isopropyl, and methyl isopropyl ethers, butyl and methyl isobutyl ethers, ethylene glycol dimethyl ether, diethylene glycol dimethyl ether, diethylene glycol monoethyl, monomethyl or monobutyl ether, and cyclic ethers such as dioxan and tetrahydrofuran (THF).

Among the ethers, preferably used are those which are miscible with water, such as methyl ether, methyl tert-butyl ether, ethyl propyl ether, methyl ethyl ether, methyl propyl ether, 1,2-dimethoxyethane, diethylene glycol monomethyl ether, diethylene glycol monoethyl ether, diethylene glycol monobutyl ether, diethylene glycol diethyl ether, dioxan and THF.

When a mixture of water with a water-miscible ether is used, both components of the water/ether mixture may be employed in any proportion within their miscibility range.

The concentration of the cobalt salts in the reaction medium is not critical; it can range from 0.001 mole per liter to the limit of solubility of the salt in the selected solvent or solvent pair at the temperature of the reaction. Preferably, this concentration can vary from 0.01 to 1 mole/liter. The solubility limit of the cobalt salt in the selected reaction medium could of course be exceeded, but this would afford no particular advantage.

Although the temperature at which the reaction can be conducted can also vary over wide limits, it is generally carried out at temperatures on the order of 10° to 150° C. and preferably from 20° to 120° C. Temperatures ranging from 25° to 75° C. are well suited. The absolute pressure of carbon monoxide can range from 1 to 150 bars of CO, and preferably from 2 to 50 bars. However, as stated earlier, the implementation of the process does not depend on the use of elevated pressures and in practice it is unnecessary to use pressures greater than 20 bars to ensure that the reaction runs properly.

The process according to the invention is particularly simple to put into practice, since it is sufficient to charge a pressure-resistant apparatus which has been purged with carbon monoxide, with water, and/or an ether, and/or an alcohol, a cobalt salt, the inorganic base and one or more sulfur compounds, then to establish an adequate pressure of carbon monoxide and to maintain the reaction medium stirred at the selected temperature for a sufficient time to ensure a satisfactory absorption of carbon monoxide. Times on the order of 1 to 5 hours are generally adequate, under the optimum conditions, to ensure a good yield of alkali metal or alkaline earth metal cobalttetracarbonylate.

The solutions of alkali metal or alkaline earth metal cobalttetracarbonylates obtained by the present process can be directly employed for carrying out a carbonylation reaction. In particular, in view of their composition, they are most particularly suitable for the carbonylation of aliphatic or aromatic compounds having halomethyl groups, to the corresponding carboxylic acids or derivatives thereof (alkali metal or alkaline earth metal salts or esters). They are especially suitable for processes for carbonylation of the compounds having a halomethyl group as described in French Patents and Patent Application No. 1,313,360; No. 70/26,593; No. 75/00,533 and Addition thereto No. 75/29,459; No. 79/16,170; No. 75/07,980 and in U.S. Pat. No. 4,351,952. In such a case it is possible, without difficulty, to link the stage of preparing solutions of alkali metal or alkaline earth metal cobalttetracarbonylates and that of carbonylation of the compounds having halomethyl groups. The use of the solutions of alkali metal or alkaline earth metal cobalttetracarbonylates obtained by the present process, in the carbonylation of compounds having halomethyl groups to carboxylic acids or their derivatives circumscribes another object of the present invention. In this case, the conditions of the carbonylation stage are those described in the above-mentioned French patents and patent applications.

The process according to the invention is most particularly suitable for the preparation of catalyst solutions intended for the carbonylation of arylmethyl halides to arylpyruvic acids and derivatives thereof according to the process described in French patent application No. 75/00,533 and Addition thereto, No. 75/29,459, and according to U.S. Pat. No. 4,351,952. The combination of the process for obtaining alkali earth metal cobalttetracarbonylates as described above with the process for preparing arylpyruvic acids by carbonylation of arylmethyl halides circumscribes yet another object of the present invention.

More specifically, another object of the present invention is a process for preparing arylpyruvic acids by reaction of arylmethyl halides with carbon monoxide, in a medium comprising water, an alcohol, an ether, or a mixture of water with an alcohol or an ether in the presence of an alkaline earth metal inorganic base and of a catalytic amount of an alkaline earth metal cobalttetracarbonylate, wherein the latter is obtained in a first stage by reaction of a derivative of cobalt (II) with carbon monoxide in the presence of an inorganic base selected from among the alkaline earth metal hydroxides and of at least one sulfur derivative which comprises at least one sulfur atom whose oxidation state is less than or equal to +3, in a medium comprising water, an alcohol, an ether or a mixture of water with an alcohol or an ether.

The combination of the stage of preparation of the alkaline earth metal cobalttetracarbonylates and the stage of carbonylation of the arylmethyl halides is facilitated by the similarity in the operating conditions of these two stages. In general, it is sufficient to add to the solutions of alkaline earth metal cobalttetracarbonylates, the arylmethyl halide, a sufficient amount of an alkaline earth metal inorganic base and, if appropriate, a solvent which can be identical to that employed in the stage of preparing the catalyst or can be different therefrom, and then to apply a suitable pressure of carbon monoxide to the medium thus obtained. It is preferable to utilize the same solvents for the catalyst preparation and carbonylation stages, such that it is sufficient to add, if necessary, to the solution resulting from the first stage, an adequate amount of water and/or an alcohol and/or an ether.

The reaction conditions of the carbonylation stage are in general those described in French patent application No. 75/00,533 and Addition thereto, No. 75/29,459, or in U.S. Pat. No. 4,351,952.

More precisely, the process according to the invention applies to the carbonylation of arylmethyl halides of the general formula:

$$(R)_n A-CH_2X \quad (I)$$

in which:
(i) A denotes an aromatic hydrocarbon radical containing 1 or 2 condensed benzene rings;
(ii) the substituent or substituents R which may be identical or different denote a linear or branched chain alkyl radical having from 1 to 4 carbon atoms, such as, for example, a methyl, ethyl, propyl or isopropyl radical, a butyl radical (optionally substituted by a nitro group or by an alkoxy radical having from 1 to 4 carbon atoms, such as a methoxy, ethoxy, propoxy or butoxy radical); an alkoxy radical such as those defined above; a halogen atom such as a fluorine, chlorine, bromine or iodine atom; or a functional group such as a nitrile, nitro or alkylcarbonyloxy group;
(iii) n denotes an integer ranging:
  (a) from 0 to 3 in the event that A contains a benzene ring,
  (b) from 0 to 5 in the event that A contains two condensed benzene rings.

Exemplary of the arylmethyl halides of the formula (I) of which use is preferably made to carry out the process according to the invention, representative are those in which:
R denotes an alkyl radical such as methyl or ethyl; a fluorine, chlorine, bromine or iodine atom;
n denotes an integer ranging:
  (a) from 0 to 2 in the event that A contains a benzene ring,
  (b) from 0 to 3 in the event that A contains two condensed benzene rings,
X denotes a chlorine or bromine atom.

Exemplary of halides of the formula (I) which are suitable for the present invention, representative are benzyl chloride or bromide, ortho-, meta- or para-methylbenzyl, 2,3-dimethylbenzyl, 2,4-dimethylbenzyl, 3,5-dimethylbenzyl, ortho-, meta- or para-fluorobenzyl, ortho-, meta- or para-chlorobenzyl, or ortho-, meta- or para-bromobenzyl chlorides or bromides; 1-chloromethylnaphthalene, 2-chloromethylnaphthalene, 1-bromomethylnaphthalene, 2-bromomethylnaphthalene, 1-chloromethyl-4-methylnaphthalene, 1-bromomethyl-5-methylnaphthalene, 1-chloromethyl-2,3,4-trimethylnaphthalene, 1-fluoro-2-bromomethylnaphthalene, or 1-methyl-2-bromomethyl-4-fluoronaphthalene.

With regard to the alkaline earth metal inorganic base employed in the carbonylation stage, this can be, equally as well, as hydroxide, an oxide or a carbonate of an alkaline earth metal. Exemplary of suitable such basic agents, representative are Ca(OH)$_2$; CaO; CaCO$_3$; Ba(OH)$_2$; BaO; BaCO$_3$; Sr(OH)$_2$; SrO; SrCO$_3$; Mg(OH)$_2$; MgO; MgCO$_3$. Calcium, barium or strontium hydroxides are particularly suitable. Preferably, calcium hydroxide is employed in both stages of the process.

The amount of the basic agent employed can also vary over wide limits. In general, an amount is used which is at least one mole per mole of arylmethyl halide of the formula (I) employed; preferably, an amount is used which is greater than this value, for example, on the order of 1.1 to 4 moles of base per mole of arylmethyl halide. The amount of alkali metal or alkaline earth metal cobalttetracarbonylates which is employed to catalyze the reaction, expressed in number of gram-atoms of cobalt per mole of arylmethyl halide, can range from 0.001 to 1; more preferably, this amount is selected from the abovementioned range such that it introduces into the reaction medium from 0.01 to 0.4 gram atoms of metal per mole of arylmethyl halide.

The suitable solvents to carry out the reaction are preferably those employed for preparing the catalyst.

Preferably, the lower alkanols having from 1 to 4 carbon atoms and the water-miscible ethers are used, and, more particularly, those mentioned above.

The carbonylation process according to the present invention is most particularly appropriate when the reaction is carried out in water/alcohol or water/ether mixtures. When the reaction is carried out in water and an alcohol or an ether, mixtures containing from 10 to 60% by weight of water and from 90 to 40% by weight of alcohol or ether are typically employed.

The concentration of the arylmethyl halide of the formula (I) employed in the reaction medium too is not critical and can vary over wide limits; thus, it advantageously ranges from 1 to 40% by weight, but it would be possible to deviate from these limits without disadvantage.

The temperature of the carbonylation stage advantageously ranges from 20° to 150° C. and preferably from 40° to 70° C., and the pressure of carbon monoxide advantageously ranges from 5 to 200 bars. It is generally unnecessary to use pressures greater than 50 bars. The reaction is desirably carried out in the presence of a large excess of carbon monoxide.

The reaction medium can subsequently be treated in various ways with a view to recovering the carbonylation products, especially the arylpyruvic acids (main products) and arylacetic acids (secondary products). A preferred treatment comprises subjecting the reaction mixture produced by the carbonylation, after dilution, if appropriate, with water and/or an ether or an alcohol, preferably heated at 50°–60° C., to a filtration such as to separate a solid fraction containing an alkaline earth metal salt of the arylpyruvic acid, from a filtrate containing an alkaline earth metal salt of the arylacetic acid.

The solid retained on the filter is next treated with an aqueous solution of an inorganic acid, such as hydrochloric acid, such as to liberate the arylpyruvic acid from its alkaline earth metal salt. The solution obtained is extracted with a suitable solvent, for example, methyl acetate. The organic extract is subjected to a distillation under a pressure which is gradually reduced without exceeding 40° C. in the mixture. The final residue comprises highly pure arylpyruvic acid. The organic extract can also be treated with a basic aqueous solution of sodium hydroxide or potassium hydroxide in order to prepare the sodium or potassium salt of the arylpyruvic acid. This salt can then be recovered highly pure from the aqueous solution, for example, by direct evaporation under reduced pressure.

The reaction filtrate can be treated, if appropriate, to recover the arylacetic acid contained therein. For example, it can be freed from the water and the organic solvent and, possibly, the unreacted arylmethyl halide which it contains by distillation at atmospheric pressure. After being cooled, the material is acidified with an inorganic acid, such as hydrochloric acid, and extracted with an appropriate solvent. The organic extract is then washed with an alkaline aqueous solution, then the aqueous wash solution is acidified and extracted to produce, after removal of the extraction solvent, a residual mixture containing the arylacetic acid.

In order to further illustrate the present invention and the advantages thereof, the following specific examples are given, it being understood that same are intended only as illustrative and in nowise limitative.

EXAMPLE 1

The following materials were charged into a stainless steel autoclave of 500 ml capacity:
(i) 4.986 g (21 mmol) of $CoCl_2.6H_2O$,
(ii) 1.379 g (5.56 mmol) of $Na_2S_2O_3.5H_2O$,
(iii) 5.95 g (80.4 mmol) of $Ca(OH)_2$,
(iv) 200 ml of isopropanol, and
(v) 40 ml of water.

After closing the autoclave, an initial carbon monoxide pressure of 10 bars was established. Stirring with a flip-flop system was started and the autoclave was heated to 50° C., over approximately 15 minutes, by means of an annular furnace. The pressure in the autoclave was then 11 bars. It was then maintained at approximately 10 bars throughout the entire test period.

After a reaction time of 4 hours, 30 minutes, at 50° C., the stirring and heating was stopped. The autoclave was cooled and degassed.

An aliquot fraction of the reaction mixture was withdrawn to determine the cobalttetracarbonylate ion by reacting the calcium cobalttetracarbonylate with iodine and determining the volume of liberated carbon monoxide. 15.54 millimoles of $Co(CO)_4^-$ ion were thus determined in the reaction mixture, equivalent to a yield of 74% relative to the cobalt chloride charged.

EXAMPLE 2

Preparation of the catalyst

The following materials were charged into a 3.5-liter stainless steel autoclave equipped with a stirrer and various pipes for introducing reactants, and heated by means of oil circulating through a jacket:
(i) 43.7 g of cobalt chloride hexahydrate,
(ii) 9.4 g of sodium thiosulfate pentahydrate,
(iii) 1.73 g of sodium sulfide monohydrate,
(iv) 56 g of lime,
(v) 1422 g of isopropanol, and
(vi) 360 g of water.

The upper space of the reactor was suitably purged free from oxygen, first with nitrogen and then with carbon monoxide.

The reaction mixture was heated to 50° C. and a carbon monoxide pressure of 10 bars was maintained for a period of 4 hours. During this period a consumption of 21.1 g of carbon monoxide was observed.

After pressure release and cooling, this mixture was diluted with 470 g of isopropanol and 120 g of water. The cobalttetracarbonyl ion was estimated as in Example 1. It was found that the reaction mixture contained 0.15 $Co(CO)_4^-$ ion, representing a yield of 81.6% relative to the cobalt chloride charged.

Double carbonylation reaction of benzylchloride 693 g of catalyst solution were preserved in the reactor described above, corresponding to 0.042 gram-ion of $Co(CO)_4^-$ (the remainder of the solution was transferred into a storage receiver purged with carbon monoxide and maintained under a slight overpressure of CO) and then 244 g of benzyl chloride, 222 g of lime, 685 g of isopropanol and 150 g of water were charged therein.

After appropriate purging, the mixture was heated to 60° C. and maintained under a carbon monoxide pressure of 5 bars for a period of 3 hours. During this period a consumption of 89.5 g of carbon monoxide was recorded, corresponding to 1.66 mole per mole of benzyl chloride. The autoclave was degassed and the precipitate obtained was then separated by filtering, washed and dried. 402.2 g of a raw product were thus obtained, containing, by analysis, 77.6% of calcium phenylpyruvate, which corresponds to a yield of 80.2% relative to the benzyl chloride employed.

After 1,000 hours' storage of the catalyst solution, as mentioned above, a new test was carried out by charging the same quantities of benzyl chloride and lime as above, 737 g of isopropanol, 151 g of water 530 g of the catalyst solution. The quantity of the active catalyst species was 0.036 gram-ion of $Co(CO)_4^-$. The mixture was heated to 60° C. and maintained for 4 hours under a carbon monoxide pressure of 5 bars. During this period, the consumption of carbon monoxide was 86.2 g corresponding to 1.60 mole per mole of benzyl chloride.

The precipitate obtained, processed in the same manner, weighed 441.6 g and contained, on analysis, 71.4% of calcium phenylpyruvate, corresponding to a yield of 81% relative to the benzyl chloride used.

EXAMPLES 3 to 19

Using the operational procedure and the apparatus described in Example 1, the conditions and the nature of the products employed in the reaction were varied. The results are reported in the following Table:

TABLE

| EXAMPLES | COBALT SALT Nature | COBALT SALT Quantity mmole | SULFUR COMPOUND Nature | SULFUR COMPOUND Quantity mmole | BASE Nature | BASE Quantity mmole | SOLVENT Nature | SOLVENT Quantity ml | Water ml | °C. | P bars | Time h | Yields |
|---|---|---|---|---|---|---|---|---|---|---|---|---|---|
| 3 | $CoCl_2 \cdot 6 H_2O$ | 21 | $Na_2S_2O_3 \cdot 5 H_2O$ | 10 | $Ca(OH)_2$ | 81 | isopropanol | 200 | 40 | 50 | 10 | 4 | 73% |
| 4 | $CoCl_2 \cdot 6 H_2O$ | 21 | $Na_2S_2O_3 \cdot 5 H_2O$ | 1.5 | $Ca(OH)_2$ | 81 | isopropanol | 200 | 40 | 50 | 10 | 7 | 55% |
| 5 | $CoCl_2 \cdot 6 H_2O$ | 21 | $Na_2S \cdot 9 H_2O$ | 5.04 | $Ca(OH)_2$ | 80 | isopropanol | 200 | 40 | 50 | 10 | 2 h 20 | 80% |
| 6 | $CoCl_2 \cdot 6 H_2O$ | 21 | $Na_2S_4O_6 \cdot 2 H_2O$ | 5.3 | $Ca(OH)_2$ | 80 | isopropanol | 200 | 40 | 50 | 10 | 2 h 40 | 70% |
| 7 | $CoCl_2 \cdot 6 H_2O$ | 21 | $Na_2S_2O_4$ | 5.17 | $Ca(OH)_2$ | 80 | isopropanol | 200 | 40 | 50 | 10 | 15 h | 94% |
| 8 | $CoCl_2 \cdot 6 H_2O$ | 21 | $Na_2S_2O_3 \cdot 5 H_2O$ | 5.4 | $Ca(OH)_2$ | 80 | isopropanol | 200 | 40 | 50 | 10 | 4 h 15 | 78% |
| 9 | $CoCl_2 \cdot 6 H_2O$ | 21 | $Na_2S \cdot 9 H_2O$ + $Na_2S_2O_3 \cdot 5 H_2O$ | 0.21 / 10 | $Ca(OH)_2$ | 80 | isopropanol | 200 | 40 | 50 | 10 | 3 h 20 | 71% |
| 10 | $CoCl_2 \cdot 6 H_2O$ | 21 | $Na_2S \cdot 9 H_2O$ + $Na_2S_2O_3 \cdot 5 H_2O$ | 0.7 / 5.2 | NaOH | 80 | isopropanol | 200 | 40 | 50 | 10 | 2 h | 38% |
| 11 | $CoCl_2 \cdot 6 H_2O$ | 21 | $Na_2S \cdot 9 H_2O$ + $Na_2S_2O_3 \cdot 5 H_2O$ | 0.4 / 5.67 | $Ca(OH)_2$ | 81 | isopropanol | 160 | 80 | 100 | 10 | 1 h 20 | 83% |
| 12 | $CoCl_2 \cdot 6 H_2O$ | 21 | $Na_2S_2O_3 \cdot 5 H_2O$ | 0.37 / 5.7 | $Ca(OH)_2$ | 81 | methanol | 240 | — | 50 | 10 | 27 h | 65% |
| 13 | $CoSO_4 \cdot 7 H_2O$ | 19.6 | $Na_2S_2O_3 \cdot 5 H_2O$ | 5.8 | $Ca(OH)_2$ | 81 | isopropanol | 200 | 40 | 50 | 10 | 24 h | 60% |
| 14 | $Co(OAc)_2 \cdot 4 H_2O$ | 19.6 | $Na_2S \cdot 9 H_2O$ + $Na_2S_2O_3 \cdot 5 H_2O$ | 1.1 / 5.4 | $Ca(OH)_2$ | 81 | isopropanol | 200 | 40 | 50 | 10 | 4 h 20 | 85% |
| 15 | $CoCl_2 \cdot 6 H_2O$ | 10 | $Na_2S \cdot 9 H_2O$ + $Na_2S_2O_3 \cdot 5 H_2O$ | 0.55 / 2.1 | $Ca(OH)_2$ | 40 | isopropanol | 100 | 20 | 50 | 10 | 4 h 30 | 68% |
| 16 | $CoCl_2 \cdot 6 H_2O$ | 21 | $Na_2S \cdot 9 H_2O$ + $Na_2S_2O_3 \cdot 5 H_2O$ | 0.4 / 5.1 | $Ca(OH)_2$ | 77 | $CH_3OH$ | 120 | 120 | 50 | 10 | 20 h | 94% |
| 17 | $CoCl_2 \cdot 6 H_2O$ | 21 | $Na_2S \cdot 9 H_2O$ + $Na_2S_2O_3 \cdot 5 H_2O$ | 0.51 / 5.3 | $Ca(OH)_2$ | 79 | isopropanol | 200 | 40 | 70 | 23 | 2 h 30 | 85% |
| 18 | $CoCl_2 \cdot 6 H_2O$ | 21 | $Na_2S \cdot 9 H_2O$ + $Na_2S_2O_3 \cdot 5 H_2O$ | 0.52 / 5.2 | $Ca(OH)_2$ | 80 | isopropanol | 200 | 40 | 25 | 10 | 20 h | 67% |
| 19 | $CoCl_2 \cdot 6 H_2O$ | 20.6 | $Na_2S_2O_3 \cdot 5 H_2O$ + $Na_2S \cdot 9 H_2O$ | 0.63 / 5.34 / 0.89 | $Ca(OH)_2$ | 80 | isopropanol | 200 | 40 | 21 | 2 | 20 h | 73% |

EXAMPLE 20

The following materials were charged into a stainless steel autoclave of 500 ml capacity:
(i) 4.986 g (21 mmol) of $CoCl_2.6H_2O$,
(ii) 1.411 g (5.7 mmol) of $Na_2S_2O_3.5H_2O$,
(iii) 7.98 g (107.8 mmol) of $Ca(OH)_2$,
(iv) 200 ml of dioxan, and
(v) 40 ml of water.

After closing the autoclave, an initial pressure of carbon monoxide of 10 bars was established. Stirring by a flip-flop system was started and the autoclave was heated to 50° C., over approximately 15 minutes, by means of an annular furnace. The pressure in the autoclave was then 11 bars. It was maintained at approximately 10 bars throughout the entire period of the test.

After 24 hours' reaction at 50° C. the stirring and the heating were stopped. The autoclave was cooled and degassed.

An aliquot fraction of the reaction mixture was withdrawn to determine the cobalttetracarbonylate ion by reacting calcium cobalttetracarbonylate with iodine and determining the volume of liberated carbon monoxide. 12.6 millimoles of $Co(CO)_4^-$ ion were thus determined in the reaction mixture, corresponding to a yield of 60% relative to the cobalt chloride charged.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of an alkali or alkaline earth metal cobalttetracarbonylate, comprising reacting a cobalt (II) compound with carbon monoxide in the presence of (i) an inorganic base which comprises an alkali or alkaline earth metal hydroxide or an alkali or alkaline earth metal bicarbonate and (ii) at least one sulfur compound comprising a sulfide, a polysulfide, a thiosulfate, a dithionate, a polythionate, or a mercaptan, and in a reaction medium consisting essentially of an alcohol, an ether, a mixture of water and an alcohol or a mixture of water and an ether.

2. The process as defined by claim 1, wherein said cobalt (II) compound comprises a salt of an inorganic or carboxylic acid.

3. The process as defined by claim 2, wherein said cobalt salt comprises a cobalt halide, nitrate, sulfate or acetate.

4. The process as defined by claim 1, wherein said at least one sulfur compound comprises an alkali or alkaline earth metal sulfide, thiosulfate, dithionite or polythionate.

5. The process as defined by claim 4, wherein said at least one sulfur compound comprises sodium sulfide, sodium thiosulfate, sodium dithionite or sodium tetrathionate.

6. The process as defined by claim 1, wherein said inorganic base comprises calcium hydroxide, sodium hydroxide or potassium bicarbonate.

7. The process as defined by claim 1, wherein said reaction medium comprises methanol, ethanol, isopropanol or tert-butanol.

8. The process as defined by claim 1, wherein said reaction medium comprises a water-miscible ether.

9. The process as defined by claim 8, wherein said ether comprises methyl ether, methyl tert-butyl ether, ethyl propyl ether, methyl ethyl ether, methyl propyl ether, 1,2-dimethoxyethane, diethylene glycol monomethyl ether, diethylene glycol monoethyl ether, diethylene glycol monobutyl ether, diethylene glycol diethyl ether, dioxan or tetra-hydrofuran.

10. The process as defined by claim 1, wherein the amount of sulfur compound, expressed in mole per gram-atom of cobalt, ranges from 0.01 to 1 mole.

11. The process as defined by claim 10, wherein the amount of alkali or alkaline earth metal base present is on the order of the stoichiometric amount.

12. The process as defined by claim 10, wherein the reaction temperature ranges from 10° to 150° C.

13. The process as defined by claim 10, wherein the carbon monoxide reaction pressure is at least 1 bar.

* * * * *